(No Model.)
F. H. TREAT, H. S. SMITH & C. PETTIGREW.
COMBINED SHEARS AND CONVEYER FOR BILLETS.
No. 455,074. Patented June 30, 1891.
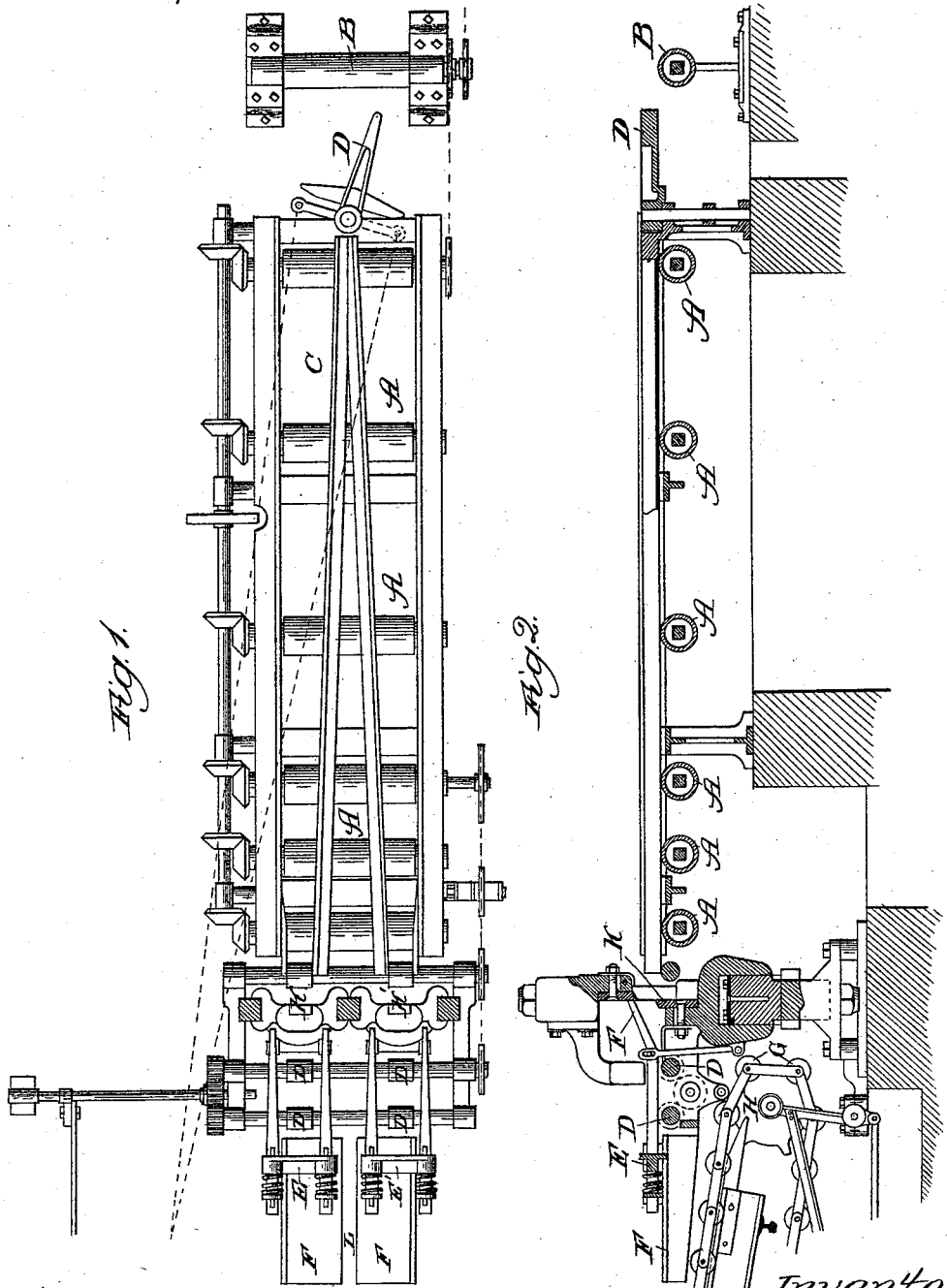
Witnesses:
Inventors:
Francis H. Treat,
Horace S. Smith,
Charles Pettigrew,

UNITED STATES PATENT OFFICE.

FRANCIS H. TREAT AND HORACE S. SMITH, OF CHICAGO, AND CHARLES PETTIGREW, OF JOLIET, ASSIGNORS TO THE ILLINOIS STEEL COMPANY, OF CHICAGO, ILLINOIS.

COMBINED SHEARS AND CONVEYER FOR BILLETS.

SPECIFICATION forming part of Letters Patent No. 455,074, dated June 30, 1891.

Application filed July 18, 1890. Serial No. 359,146. (No model.)

*To all whom it may concern:*

Be it known that we, FRANCIS H. TREAT and HORACE S. SMITH, both of Chicago, Cook county, Illinois, and CHARLES PETTIGREW, of Joliet, Will county, Illinois, have invented a new and useful Improvement in a Combined Shears and Conveyer, of which the following is a full, true, and exact description, reference being had to the accompanying drawings.

Our invention relates to an improvement in duplex shears by which metal can be sheared alternately into determined lengths or billets and the said billets automatically dropped from the duplex shears into a conveyer, by which they are removed to the place of use.

Our invention will be readily understood from the accompanying drawings, in which—

Figure 1 represents a plan of our contrivance, and Fig. 2 a vertical section through the same.

The duplex shears and the particular form of conveyer here specified are shown in applications Serial Nos. 359,140 and 359,152, this day executed by us, to which we refer for a fuller description; and we do not limit ourselves to these particular forms of shears and conveyers, except as specified in the claims herein, the object of our invention being to combine the duplex shears with a conveyer, so that the metal sheared from either shears shall be delivered upon the conveyer and automatically removed thereby.

A A A represent the rollers of a transfer-table, to which the metal to be sheared is fed by the rollers B. This table is provided with a dividing-partition C, which directs the metal to either one of the shears K K' alternately. The lower blades of these shears are movable, and attached to them are the gage-stops E E', which are raised when the cylinders carrying the shears are raised, thereby allowing the onward movement of the sheared metal by means of the rollers D D, which may be continuously operated, or operated whenever it is desired to forward the metal. In combination with the rollers D D is the chute F, wide enough to include the delivery from both shears, and open at the bottom, as at L, to deliver the billet upon the conveyer-rollers G, which rollers being constantly operated remove the billets, and they are fed through the opening L out of the way of the subsequently-falling billets. The shears K K' are operated by any suitable mechanism alternately, so that while one is rising the other is falling. In this way the feeding of two billets simultaneously to the chute F is prevented, which otherwise might fall in said chute and block the operation of the machine.

The operation of our machine can now be readily understood. The metal to be sheared is fed in upon the rollers B and directed by the switch D', under the control of the operator, as desired, to one side or the other of the partition C, and thence to the shears K or K', as desired. The metal is advanced by the rollers through the open shears, as shown at Fig. 2, until it is brought up against the stop E. Then the shear-knife K, rising, cuts the billet, and at the same time removes the gage-stop E from its path of motion, so that it is fed onward by the rollers D D into the chute F, and thence through the opening L upon the conveyer-rollers G G, by which it is continuously removed. While one shears is operating to cut the metal the other is opening to receive the subsequent metal to be cut.

What we claim as our invention, and desire to secure by Letters Patent, is—

1. The combination of the duplex shears and conveyer located beneath the level of the delivery of the metal and the chute receiving the metal from both shears and delivering the same upon the conveyer, substantially as described.

2. The combination, in duplex shears, of a conveyer-table, a partition thereupon, a switch for switching the metal to one or the other of the duplex shears, the duplex shears, two gage-stops operated by the hydraulic cylinders and alternately raised from the path of the moving metal, a chute receiving the metal when the said gage-stops and shears are operated, and the conveyer beneath said chute receiving the metal from both shears, substantially as described.

3. The combination of the alternately-operated duplex shears K K', the chute F F, having laterally-inclined sides wide enough to receive the metal from both shears, the opening L, and the conveyer G beneath the opening L, substantially as described.

FRANCIS H. TREAT.
HORACE S. SMITH.
CHARLES PETTIGREW.

Witnesses:
EPHRAIM BANNING,
SAMUEL E. HIBBEN.